United States Patent [19]

Chapa et al.

[11] Patent Number: 4,507,933
[45] Date of Patent: Apr. 2, 1985

[54] SYSTEM COMBINING WATER HEATER AND REFRIGERATION UNIT

[75] Inventors: Roman Chapa, 93 Greenhaven Rd., Rye, N.Y. 10580; Ronald Baumgarten, New York, N.Y.

[73] Assignee: Roman Chapa, Rye, N.Y.

[21] Appl. No.: 147,265

[22] Filed: May 5, 1980

[51] Int. Cl.³ .............................................. F25B 39/04
[52] U.S. Cl. .................................... 62/184; 62/196.4; 62/238.6
[58] Field of Search ............. 62/238 E, 324 D, 196 B, 62/184, 238.6, 324.5, DIG. 17; 165/179, 157, 163

[56] References Cited

U.S. PATENT DOCUMENTS

| | | | |
|---|---|---|---|
| 2,986,899 | 6/1961 | Schenk et al. | 62/196 B |
| 3,613,391 | 10/1971 | Harter | 62/184 |
| 3,905,202 | 9/1975 | Taft et al. | 62/196 B |
| 3,916,638 | 11/1975 | Schmidt | 62/238 E |
| 3,976,123 | 8/1976 | Davies | 165/29 |
| 4,098,092 | 7/1978 | Singh | 62/324 D |
| 4,103,509 | 8/1978 | Bottum | 62/238 |
| 4,161,214 | 7/1979 | Wendel | 165/179 |
| 4,193,781 | 3/1980 | Vogel et al. | 62/DIG. 17 |
| 4,226,606 | 10/1980 | Yaeger et al. | 62/238 E |

Primary Examiner—Harry Tanner
Attorney, Agent, or Firm—Michael Ebert

[57] ABSTRACT

A thermally integrated system combining a water heater tank with a refrigeration unit in a manner whereby heat dissipated by the unit serves to heat the water in the tank, the efficiency of the unit being maintained despite changing temperatures in the water tank. In this system, an external line conducting the refrigerant and acting as an auxiliary condenser is extended between the compressor and the main condenser of the refrigerator unit. The external line first passes through the upper region of the tank where it acts in conjunction with a water jacket interposed in the tank outlet pipe as a heat booster, the line then running in a coiled formation through the lower region of the tank in heat exchange relation with the relatively cold incoming water supplied by an inlet pipe. An automatic control assembly functions to divide the condensation function of the refrigeration unit between the auxiliary and main condensers and to activate the main condenser in response to changing temperatures in the water tank.

1 Claim, 3 Drawing Figures

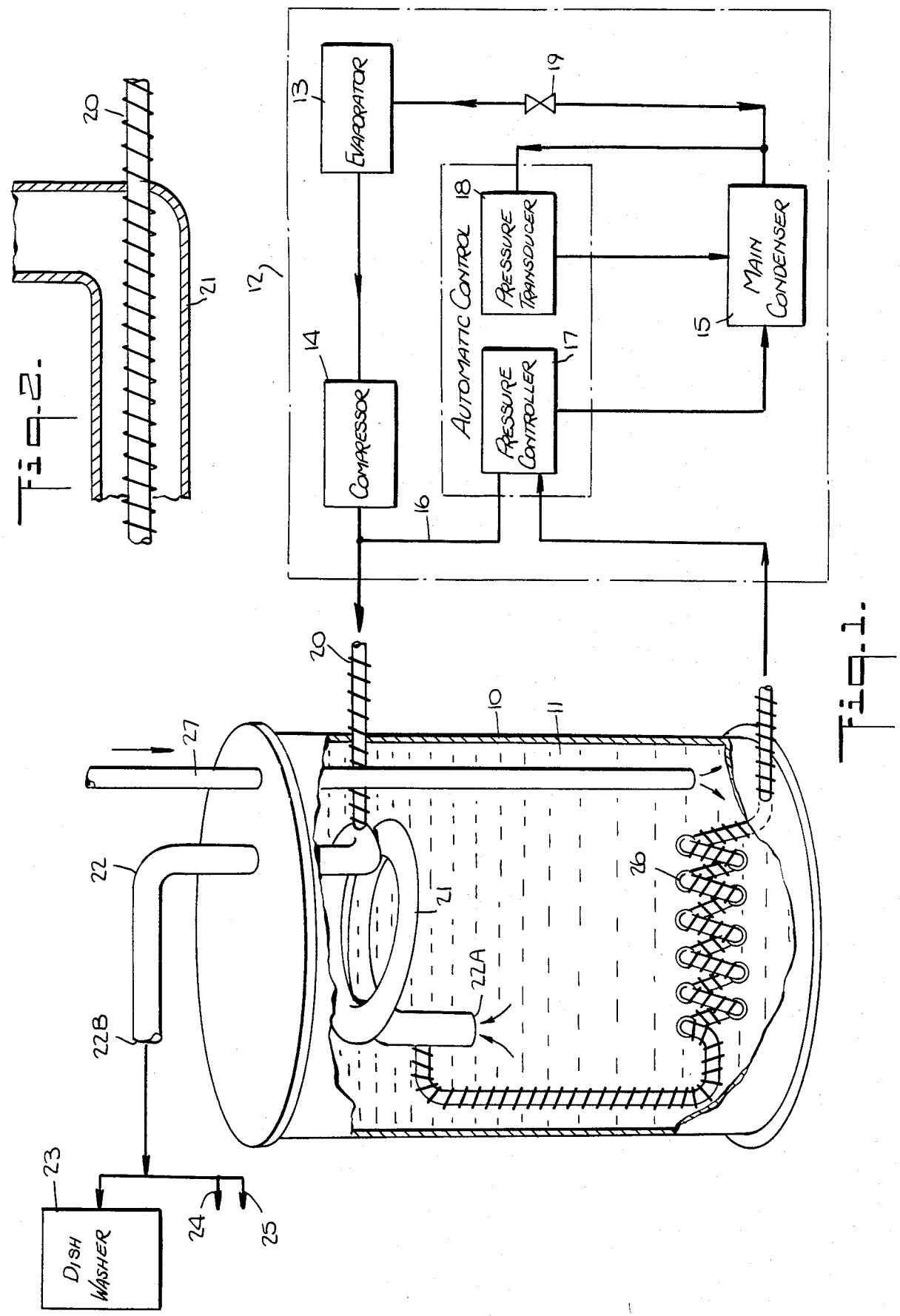

SYSTEM COMBINING WATER HEATER AND REFRIGERATION UNIT

BACKGROUND OF INVENTION

This invention relates generally to a system combining a water heater tank with a refrigeration unit in a manner whereby energy for heating the water is extracted from the unit, and more particularly to a thermally integrated system of this type in which the heat dissipated by the refrigeration unit is fully exploited, yet its efficiency is maintained despite changing temperatures in the water tank.

There are many facilities which require a refrigeration unit as well as a hot water source. Thus the typical restaurant must have one or more refrigerator units in which to refrigerate vegetables, meats and liquids, and it must also have a hot water supply to carry out various cleaning operations.

In the usual restaurant installation, an electrically-energized refrigerator unit is operated in a manner totally independent of the water heater, as a consequence of which heat removed in the condensing process is wasted. And where the removed heat is not discharged through an exterior vent but into the area in which the refrigeration unit is installed, this heat may impose an additional load on an air conditioning system operating in that area. On the other hand, the conventional water heater is energized by a gas, oil, or electrical supply. Where the demand for heated water is high, the energy costs therefor are substantial.

The concept of extracting heat from a refrigeration unit for the purpose of heating the water in a water heater is well known in the art. Thus in the 1979 patent to Amthor, Jr., U.S. Pat. No. 4,173,872, the condenser coil of a refrigeration unit is disposed within a water tank and serves to raise the temperature of the water therein. Arrangements along similar lines are disclosed in the patents to Hammell, U.S. Pat. No. 2,668,402; Johnson, U.S. Pat. No. 4,178,769; Mueller, U.S. Pat. No. 4,146,089 and Eggleston, U.S. Pat. No. 2,125,842.

While the arrangements disclosed in these prior patents serve to utilize otherwise wasted energy, they fail to fully and effectively exploit the available heat energy and make no adequate provision to maintain efficient operation of the refrigeration unit under optimum conditions regardless of the changing demand for hot water normally experienced in a restaurant or similar facility.

For example, if the condenser coil of the refrigeration unit is disposed within the water tank in heat exchange relation with the water therein, and no water is withdrawn from the tank for a prolonged period, the rising temperature of the water in the tank will approach the temperature of the refrigerant passing through the coil. As a consequence, a proper condensing action will not take place, causing the refrigerator unit to automatically cut off.

If, on the other hand, heated water is continuously drawn from the water tank so that the temperature of the water in the tank begins to approach the relatively low temperature of incoming water replenishing the water withdrawn from the tank, then an excessive condensing action will take place which will interfere with the proper operation of the refrigeration unit.

SUMMARY OF INVENTION

In view of the foregoing, the main object of the invention is to provide an improved system combining a water heater tank with a refrigeration unit whereby energy for heating the water is extracted from the unit and the efficiency of the unit is maintained despite changing temperatures in the water tank.

More particularly, it is an object of this invention to provide a system of the above type in which an external line carrying the refrigerant and acting as an auxiliary condenser is extended from the compressor of the unit to the main condenser thereof, the external line first passing through the upper region of the tank where it serves in conjunction with a water jacket interposed in the tank outlet pipe as a heat booster, the external line then running through the lower region of the tank in a coiled formation in heat exchange relation with the relatively cold incoming water.

Also an object of this invention is to provide a system of the above type which includes automatic control means to divide the condensation function of the refrigerator unit between the auxiliary and main condensers in a manner maintaining the operation of the unit at optimum efficiency regardless of the temperature of the water in the heater tank.

Yet another object of this invention is to provide a system of the above type which is of relatively simple design and which operates efficiently and reliably to effect a substantial saving in energy requirements.

Briefly stated, these objects are attained in a thermally integrated system combining a water heater tank with a refrigeration unit in a manner whereby the heat dissipated by the unit is fully exploited to heat the water in the tank, yet the efficiency of the unit is maintained under optimum conditions despite changing temperatures in the water tank.

In this system, an external refrigerant line acting as an auxiliary condenser is extended between the compressor and the main condenser of the refrigerator unit, the external line first passing through the upper region of the tank where it serves in conjunction with a water jacket interposed in the tank outlet pipe as a heat booster, the line then passing in a coiled formation through the lower region of the tank in heat exchange relation with the relatively cold incoming water supplied by an inlet pipe whereby the water heated thereby flows by convection toward the upper region where the temperature thereof is boosted as the water is discharged through the outlet pipe.

Automatic control means act to divide the condensation function of the refrigeration unit between the auxiliary and main condensers in response to changing temperature in the water tank, the condensation action of the main condenser being increased when the water in the tank is at a high temperature.

OUTLINE OF DRAWINGS

For a better understanding of the invention as well as other objects and further features thereof, reference is made to the following detailed description to be read in conjunction with the accompanying drawings, wherein:

FIG. 1 is a block diagram of a thermally integrated system in accordance with the invention, the water tank being shown in section;

FIG. 2 is a section taken through the heat booster in the water tank; and

DESCRIPTION OF INVENTION

Figure 3:
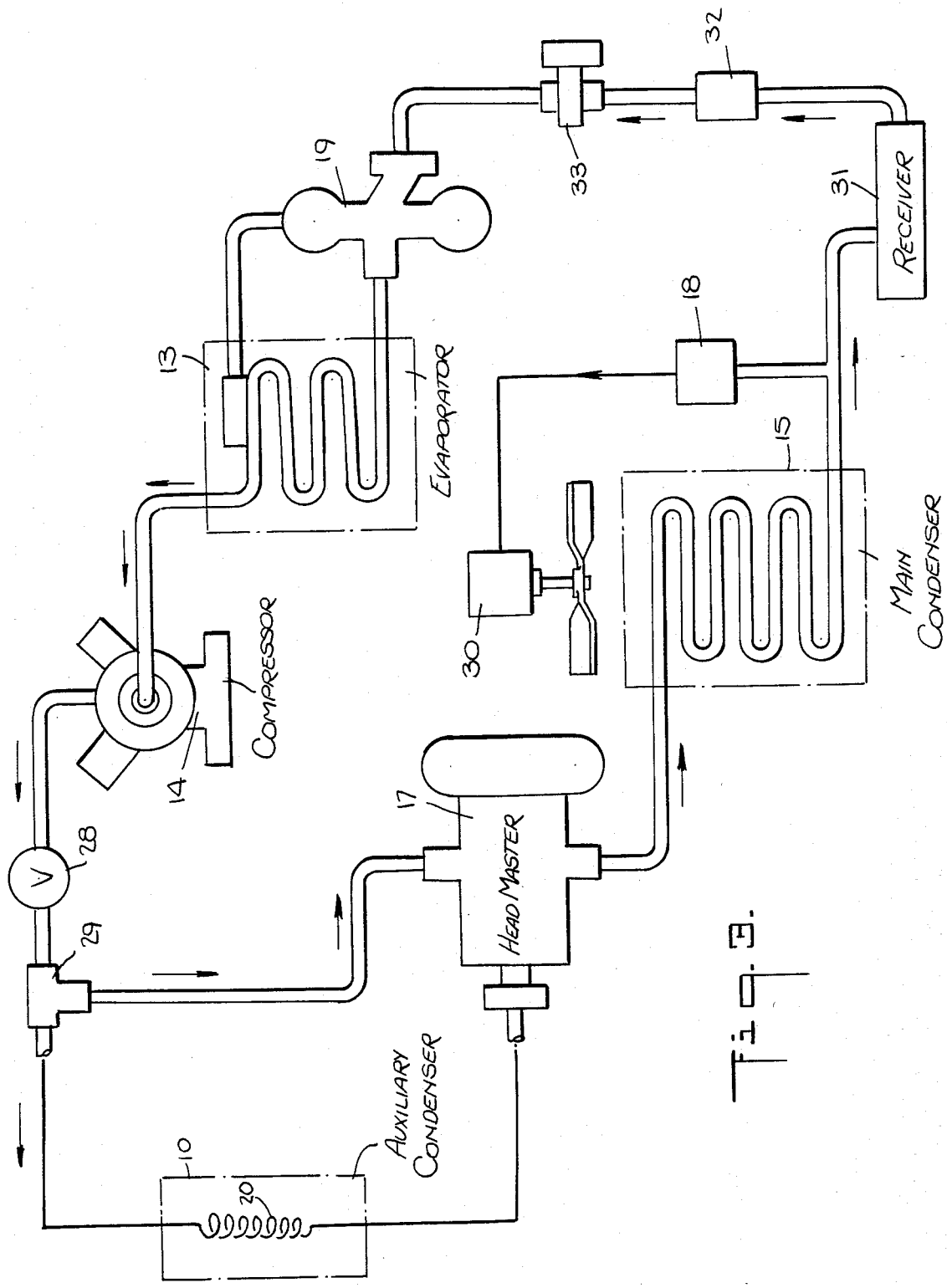
FIG. 3 is a schematic diagram of the refrigeration unit.

Referring now to FIG. 1, a thermally integrated system in accordance with the invention comprises a water tank 10 filled with water 11 and operating in combination with a refrigerator unit, generally designated by numeral 12. The arrangement is such that heat given off by unit 12 serves to heat water 11.

It is known that the temperature at which a liquid boils and turns to vapor depends on ambient pressure. Thus at atmosphere 1 (normal atmospheric pressure), water boils at 100° C., but at a reduced pressure of 0.1 atmosphere, it boils at only 46° C. Conversely, water vapor at 50° C. at 0.1 atmosphere can be condensed and thereby converted back to liquid simply by increasing the pressure to, say, 1 atmosphere. It is also known that in passing from the liquid to vapor phase, every liquid absorbs heat and that it subsequently gives off this heat on condensing. In modern refrigerators, use is made of a refrigerant with a low boiling point, such as Freon.

In the compressor-type unit 12, when the refrigerant is under low pressure it is evaporated in an evaporator 13 which takes the form of a coiled pipe installed in the freezer compartment of the unit. Evaporation draws heat from the freezer compartment to lower its temperature, the extracted heat raising the temperature of the refrigerant vapor. The hot vapor is drawn out of evaporator 13 by a compressor 14 which compresses the vapor. In a conventional refrigerator, the compressor feeds the hot vapor to a condenser. In the present invention, compressor 14 passes the hot vapor to a main condenser 15 through an internal line 16 having a pressure controller or head master 17 interposed therein whose main function will be later explained.

When main condenser 15 is rendered active by a pressure transducer 18, whose function will also be later explained, it dissipates the heat from the vapor passing therethrough. As a result of the pressure applied to the vapor by the compressor and the loss of heat experienced in the condenser, the refrigerant condenses. Finally, the refrigerant, which is now in the liquid state, is expanding in an expansion valve 19 to reduce its pressure, this low pressure liquid being returned to evaporator 13 to repeat the refrigeration cycle.

Water tank 10 is coupled to refrigeration unit 12 by an external line 20 which functions as an auxiliary condenser, the line carrying the hot vapor from compressor 14 through the upper region of water tank 10. The external line, which is preferably in the form of a copper pipe having a helical fin thereon to promote heat radiation, is looped in the upper region of the tank and is surrounded by a water jacket 21.

Water jacket 21 is interposed in an outlet pipe 22, the input end 22A of which lies within the upper region of the tank to receive water therefrom. The output end 22B of outlet pipe 22 is outside of the tank and is coupled to a dishwasher 23 as well as to other pipes 24 and 25 supplying hot water to faucets and other hot water outlets.

From water jacket 21, external line 20 extends downwardly in the tank to the lower region thereof where the line is coiled to define a heat-exchanger 26, the external line then going to main condenser 15 through pressure controller 17. Incoming water under pressure from a municipal or other available supply is fed into the tank through an inlet pipe 27 which discharges this water into the bottom region thereof.

The auxiliary condenser defined by external line 20 effects condensation of the hot vapor from compressor 14. Such condensation occurs in the lower region of the water tank where the hot vapor passes through heat exchange coil 26. As a consequence, the water heated in the lower region of the tank flows by convection toward the upper region thereof and is discharged from the tank through outlet pipe 22. In passing through water jacket 21 surrounding outlet pipe 22 in the upper region, the heated water is further heated by the hot vapor conducted in pipe 20 extending through the jacket. Thus the jacket functions as a heat booster.

In practice, the temperature of the hot vapor from the compressor is in excess of 160° F. The auxiliary condenser within water tank 10 serves to raise the temperature of the water to about 130° to 140° F. Water at this temperature is sufficiently hot for most cleansing functions. However, where sterilization is necessary, as in dishwasher 23, the dishwasher includes a heater to further boost the temperature to a level sufficient to cause the water to function as a disinfectant. The present arrangement effects a considerable economy in energy costs, for the refrigerator unit consumes its normal amount of energy, whereas there are no energy requirements for the water heater, which makes use of heat generated by the unit which is otherwise wasted.

There are two conditions which arise that require compensation in order to maintain the refrigeration unit in operation with optimum efficiency. The capacity of tank 10 is such as to meet predicated requirements for hot water in the facility in which the system is installed. However, the actual demand for hot water on an hour-to-hour basis, say, in a restaurant, cannot be foreseen; for there are occasions when very little water is taken from the tank and others when the water is being withdrawn almost without interruption.

Let us first consider the situation in which little water is withdrawn from tank 10 for a prolonged period. The temperature of the incoming water is usually between about 40 and 50 degrees Fahrenheit, depending on the season of the year and the nature of the water source. The auxiliary condenser in tank 10 formed by external line 20 carries a refrigerant whose temperature is between about 160 and 170 degrees Fahrenheit. Because of this heat exchange relationship between the water in the tank and the auxiliary condenser, the water in the tank, if not replenished by cold water, will gradually have its temperature approach that of the hot refrigerant.

As a consequence of this action, the heat differential between the hot water in the tank and the temperature of the refrigerant running through auxiliary condenser 20 is not sufficient to effect condensation of the refrigeration. This condition is reflected in the increased pressure developed at the output side of main condenser 15 which up to this point has remained in the inactive state.

Main condenser 15 may be in the form of a heat exchange coil operating in conjunction with a fan to dissipate the heat in the refrigerant conducted through the coil, thereby condensing the refrigerant. Or it may make use of a water flow system which runs over the condenser coil to carry away the heat for the same purpose. Condenser 15 is effectively inactive when either the fan or the water flow system is cut off.

In order to render main condenser 15 active when auxiliary condenser 20 is unable to effect condensation because of the elevated temperature of the water in the tank, pressure transducer 18, which senses this condition, acts to turn on the fan or render the water flow system effective, depending on the nature of the main condenser. Thus in the case of a fan-operated main condenser, the pressure transducer actuates a switch when the water temperature in the tank exceeds, say, 135° to 140° F. and the resultant pressure exceeds a pre-set level. In the case of a water-cooled condenser, pressure transducer 18 functions to open a valve to initiate the flow of water.

The second condition encountered in practice occurs when hot water is drawn from the tank at so rapid a rate that the dwell time of the water in the tank is not sufficient to permit the water to rise in temperature from the incoming cold temperature of 40° to 50° F. to about 125° to 135° F., the preferred hot water temperature. In this situation, the water temperature in the tank begins to approach the low temperature of the incoming water, in which event excessive condensation occurs in the auxiliary condenser, which condition is reflected by the reduced pressure in the output of the auxiliary condenser.

Pressure controller 17, which in practive may be a "Head Master" pressure regulator, such as that marketed by the Alco Control Division of Emerson Electric Co., is reponsive to the pressure differential between the input and output of the auxiliary condenser line 20. This regulator acts to divert hot vapor from compressor 14 away from the auxiliary condenser 20 and to feed it directly into main condenser 15 through internal line 16 to an extent necessary to provide the optimum pressure conditions. In this situation, main condenser 15 is in its inactive state, whereas the auxiliary condenser 20 in a sense is excessively active. Hence by distributing the hot vapor between the two condensers, the proper degree of condensation is attained.

Pressure controller 17 and pressure transducer 18 form an automatic control assembly to regulate the operation of the thermally integrated system to maintain the refrigeration unit in efficient operation regardless of the temperature in the water tank.

In FIG. 2, the refrigeration unit is shown in greater detail, whereas the water heater tank 10 has its auxiliary condenser 20 represented schematically. It will be seen that the output of compressor 14 is fed to auxiliary condenser 20 through a check valve 28 and that internal line 16 is coupled to the input to the auxiliary condenser by a T-junction 29. Main condenser 15 is rendered active by a motor-driven fan 30 whose operation is governed by pressure transducer 18, such that if the water in tank 10 is so hot that effective condensation does not take place in the auxiliary condenser, then condensation is effected in the main condenser.

From main condenser 15, the refrigerant is conducted to a receiver 31 whose output is fed to a dryer 32. From dryer 32 the refrigerant goes through a solenoid valve 33 to the expansion valve 19 which is a thermo X-pan valve, the expanded refrigerant then going into evaporator 13.

While there has been shown and described a preferred embodiment of a system combining water heater and refrigerator unit in accordance with the invention, it will be appreciated that many changes and modifications may be made therein without, however, departing from the essential spirit thereof.

We claim:
1. A thermally-integrated system comprising:
A. a compressor-type refrigeration unit including an internal line conducting a refrigerant in hot vapor form from a compressor to a normally-inactive main condenser, the refrigerant from the main condenser going through an expansion valve into an evaporator which returns the refrigerant to the compressor:
B. a water heater tank including an inlet pipe feeding relatively cool incoming water into the lower region of the tank, and on outlet pipe drawing heated water from the upper region of the tank;
C. an external line functioning as an auxiliary condenser, said external line running from the compressor to the main condenser through the water tank, the external line entering the tank in the upper region thereof where it passes through a water jacket interposed in the outlet pipe to serve as a heat booster, the external line then going to the lower region where it is coiled to define a heater exchanger to heat the water and condense the hot vapor; and
D. means to render said main condenser active when the water temperature in the tank is too high to effect condensation of the hot vapor by the auxiliary condenser, said means including a pressure-responsive transducer coupled to the output of the main condenser to produce a control signal when the tank water temperature exceeds a predetermined level and a motor-driven fan responsive to said control signal to activate said main condenser.

* * * * *